Jan. 1, 1929.
J. H. REDHEAD
SHOCK ABSORBER
Filed Oct. 12, 1925
1,697,610
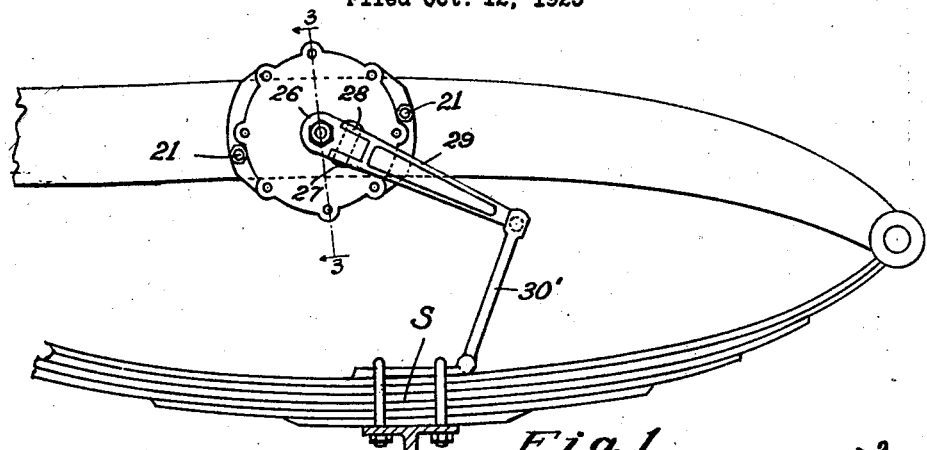
Fig. 1
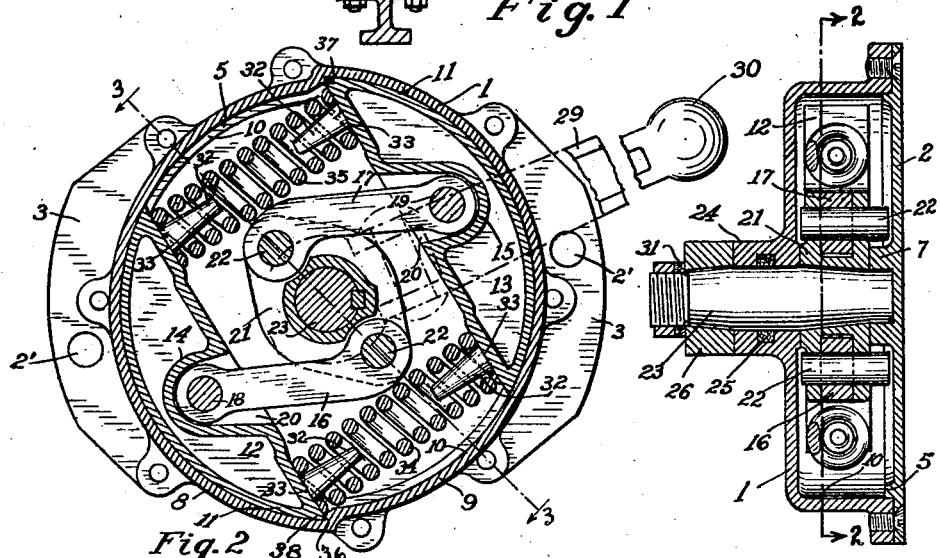
Fig. 2
Fig. 3
Fig. 4
INVENTOR
J. Hartzler Redhead
BY
Richey, Slough & Watts
ATTORNEY Patented Jan. 1, 1929.

1,697,610

UNITED STATES PATENT OFFICE.

JACOB HARTZLER REDHEAD, OF CLEVELAND, OHIO.

SHOCK ABSORBER.

Application filed October 12, 1925. Serial No. 61,919.

My invention relates to shock absorbers and more particularly to that class of shock absorber which cooperates with the springs of vehicles to absorb shock imparted to the vehicle body and to retard rebound movements of the body.

An object of my invention is to provide a shock absorber which permits limited free movement of the body in one direction, but which retards movement of the body in the other direction.

Another object of my invention is to provide a friction shock absorber which will not only retard rebound movements of a body to which it is attached, but will also retard abnormal movements of the body in the opposite direction.

Other objects and advantages of my invention will become apparent from the following description of one embodiment thereof, reference being made to the accompanying drawings in which like characters are employed to designate like parts throughout the same, and in which—

Fig. 1 is a view showing my invention applied to the frame of an automobile;

Fig. 2 is a vertical section through the shock absorber taken on line 2—2 of Fig. 3.

Fig. 3 is a section on line 3—3 of Fig. 2; and

Fig. 4 is a detail plan of the securing plate.

In the accompanying drawings 1 represents a housing or drum and 2 represents a plate forming part of the housing and which is provided with outwardly extending securing flanges 3. The plate 2 is drilled at 2′ for the purpose of securing the device to the body or chassis of a vehicle or the like which is subject to shock and on which it is desired to provide means for absorbing such shocks.

The plate 2 is shaped as in Fig. 4, being provided with bolt holes 4 around its periphery and having an upturned flange 5 therearound. The flange is shaped as shown and defines two or more arcs 8′ and 9′ essentially alike, but formed on different centers such as C and C′, respectively. A bearing socket 7 is formed integrally with the plate and is concentric with the main center 6.

The drum or cover 1 is essentially of the same shape as the flange 5 and is adapted to seat thereover when the device is assembled, the drum side walls being generated about different centers, as I have shown in drawings where I have illustrated a drum made of semicircular sections or arcs 8 and 9 in which the respective centers C and C′ are staggered in parallel planes and equally with respect to center 6 so that the respective arcs are arranged as shown. The inner drum walls engage and seat over the flanges 5 of the plate 2 forming a leak-proof joint, since when the drum is assembled for use, it is filled with oil or grease. The inner peripheral walls 10 of the drum are shaped similar to the flange 5 of the plate, and provide contacting surfaces against which the adjacent contacting walls 11 of the shoes are forced.

Shoes 12 and 13 are of substantially the same shape having arcuate exterior contacting walls 11 which are adapted to frictionally engage the inner walls 10 of the drum. The shoes are preferably hollow and are provided with depressions 14 and 15, respectively. Spreading links 16 and 17 are pivotally connected within the depressions at one end by pins 18 and 19, respectively. The openings 20 are wide enough to permit the desired movement of the links without interference.

The opposite ends of the links are pivotally secured to a yoke or collar 21 by pins 22 extending therethrough. The collar 21 is keyed to a shaft 23 extending axially through the housing 1 and which is seated at its inner end within the socket 7. The housing 1 terminates on its true center 6 in a bearing member 24 in which a packing 25 of felt or the like is held in contact with the shaft to prevent leakage of oil or grease from the drum at this point.

The outer end of the shaft 23 carries a lever attaching member 26 keyed thereto. This member terminates in an apertured tongue 27 for the purpose of receiving the apertured bifurcated end 28 of an operating lever 29. The extreme outer end of the operating lever is preferably ball-shaped as shown at 30, for universal connection with the connecting link 30′ which is pivotally secured to the vehicle spring or axle S. The outer end of the shaft 23 is threaded to receive a locking nut and washer 31 for holding the member 26 in place.

Each of the shoes 12 and 13 is provided with spring retaining and guide pins 32 preferably having tapered walls to permit lateral movement of the coil springs 34 and 35 and projecting from adjacent the ends of the inner walls 33 of each of the shoes preferably in alignment with the adjacent pins on the other shoe when the shoes are in the position shown in Fig. 2. Coil springs 34 and 35 are carried by the pins as shown in the drawings and are normally under compression so that the shoes will be normally forced into frictional contact with the adjacent inner walls of the housing.

It will be noted that the peculiar shape of the peripheral inner walls 10 of the drum formed by the eccentric sections, provide seats 36 and 37 on the interior of the drum walls at the points of intersection of the eccentrically arced walls 8 and 9. The seats thus formed not only serve as a stop for the respective shoes when the latter are moving in a counter-clockwise direction as shown in Fig. 2, but also serve as bearing points for the shoes when excessive downward stresses are applied to the vehicle body and the lever 29 is subjected to unusual upward movement.

The shock absorber above described is attached to a portion of the vehicle frame preferably above the vehicle axles as shown in Fig. 1. In use, when the vehicle is subjected to sudden and severe shock as caused when engaging a bump or rut in the roadway over which the vehicle travels, the vehicle body will first move downwardly which causes the lever 29 to rock upwardly. When the lever is caused to move in a counter-clockwise direction, as in Fig. 2, rotating shaft 23 and contracting links 16—17, the shoes 12 and 13 will be shifted within the drum until their respective ends 38 and 39 seat within the seats 36 and 37, respectively, formed by the intersecting walls of the housing. Further upward movement of the lever will cause the shoe 12 to pivot about its end 38, the link 16 pulling the other end of the shoe inwardly against the spring 35. The shoe 13 will pivot in a similar manner and its free end will be pulled inwardly against spring 34. As the shoes swing inwardly against the compression of springs 34 and 35, they will at all times have their inner adjacent walls substantially parallel, and as the shaft 23 continues to rotate the shoes will be drawn closer and closer together, but in substantially spaced parallel relation. The springs will be considerably distorted in taking such excessive shock, but are held in place on the shoes by the guide pins 32. The springs, therefore, take up most of the shock during this cycle of operation of the device. This action tends to check any excessive downward movement of the vehicle body, thus reducing the shock in this direction.

On the rebound movement of the vehicle body, the lever will rock downwardly causing the shaft 23 to rotate in the opposite direction, to project the links outwardly and in a clockwise direction, as in Fig. 2, and will cause the shoes 12 and 13 to be shifted from the seats 36 and 37, respectively, and be projected under force into frictional contact with the inner contacting walls of the drum. As the shoes travel along the inner drum surfaces from the seats 36 and 37, they are forced into greater frictional contact with the inner walls of the drum by the springs 34 and 35 and also by the pushing action of the links. This pushing action is more pronounced in my apparatus since I have provided a drum wherein the sections are formed eccentrically to the true center 6 of the plate and drum. Also since the links operate on centers which are defined as pins 22 in Fig. 2, it will be noted that if an imaginary line be drawn from the center of either of such pins to points along the inner contacting walls 10 or 11 of the drum, these lines will not represent true radii with respect to the center 22 and the arcuate walls 10 and 11 which they intersect. Therefore, it will be seen that upon rebound movement of the car body or downward movement of the arm 29, the links will force the respective shoes into frictional engagement with the walls 10 and 11 from a point off the true center of the arc described by the walls. At the moment of application the rebound shock is cushioned almost entirely by the shoes engaging the walls 10 and 11, but as the shock is being taken up and the collar 21 rotates in a clockwise direction, Fig. 2, the links will assume a greater angle from the horizontal in Fig. 2 and will function to move the shoes along the inner walls 10 and 11 while in engagement therewith and against the compression of springs 34 and 35. As this movement progresses the effective working angle at which the links are disposed will be increased resulting in a gradual decrease in cushioning effort as the rebound is finally dissipated.

I have, therefore, provided a shock absorber to be used in conjunction preferably with the usual springs of a vehicle to retard and check shock and rebound imparted to the vehicle body.

Although I have shown a drum and plate having only two eccentric arcs and two shoes cooperating therewith, it will be understood that I do not wish to be limited to this number since I may use any number desirable.

Various changes may be made in the construction and arrangement of parts of my invention without departing from the spirit of my invention or the scope of the appended claims.

I claim:—

1. In a shock absorber, a casing, the interior side walls thereof having a plurality of frictional contact surfaces formed about different centers, shoes frictionally engaging the said contact surfaces within the casing, and means including a lever, and links movable by said lever and connected to said shoes for moving the shoes along the said surfaces and toward each other when the lever is moved in one direction.

2. In a shock absorber, a casing, the interior side walls thereof having a plurality of frictional contact surfaces formed about different centers, shoes frictionally engaging the said contact surfaces within the casing, and means for moving the shoes along the said contact surfaces and away from each other, said means including compression springs seated in the adjacent opposed ends of the shoes.

3. In a shock absorber, a casing, the interior side walls thereof having a plurality of frictional contact surfaces formed about different centers, shoes frictionally engaging the said contact surfaces within the casing, and means including a compression device between said shoes, a lever, and links movable by said lever and connected to separate said shoes for moving the shoes along the said contact surfaces and away from each other when said lever is moved in one direction.

4. In a shock absorber, a casing, the interior side walls thereof having a plurality of frictional contact surfaces formed about different centers, shoes frictionally engaging said contact surfaces within the casing, and means for moving the shoes along the said contact surfaces and away from each other, said means including a compression device between said shoes, a lever, and links movable by said lever and connected to separate said shoes in cooperation with said compression device.

5. In a shock absorber, a casing therefor consisting of a plate, and a cover for said plate, the inner side walls of said cover forming two eccentric semi-circular frictional contacting surfaces, the adjacent ends of said surfaces forming stops, shoes frictionally engaging said contact surfaces, and means for moving said shoes along said contact surfaces and into engagement with said stops.

6. In a shock absorber, a casing therefor consisting of a plate, and a cover for said plate, the inner side walls of said cover forming two eccentric semi-circular frictional contacting surfaces, the adjacent ends of said surfaces forming stops, shoes frictionally engaging said contact surfaces, and means for moving said shoes along said contact surfaces and into engagement with said stops, said shoes being movable toward each other about respective stops on the casing when said means is actuated excessively.

7. In a shock absorber, a casing including a disc and a flange, the flange being formed with similar semi-circular frictional contacting inner surfaces generated about different centers, shoes movable within the casing, seats formed in the semi-circular inner surfaces, means for moving said shoes toward each other along the said inner surfaces and into engagement with said seats.

8. In a shock absorber, a casing including a disc and a flange, the flange being formed with similar semi-circular frictional contacting inner surfaces generated about different centers, shoes movable within the casing, seats formed by the adjacent edges of said semi-circular inner surfaces, means for moving said shoes toward each other along the said inner surfaces and into engagement with said seats.

9. In a shock absorber, a plate having an irregular flange formed thereon about different centers, a cover seating over said flange on said plate, the inner side walls of said cover providing frictional contact surfaces, a rotatable shaft extending axially through said cover and seating in said plate, an operating lever keyed to said shaft, a yoke keyed to said shaft within said cover, links pivoted to and movable by said yoke, shoes movable within the cover in engagement with the frictional contact surfaces thereof, the opposite ends of said links being pivotally connected to said shoes, and springs intermediate the adjacent opposite ends of said shoes to normally move said shoes away from each other and into frictional engagement with said cover frictional contact surfaces.

10. In a shock absorber, a casing, the interior side walls thereof having a plurality of frictional contact surfaces formed about different centers, shoes frictionally engaging the said contact surfaces within the casing, and means including a lever, and links movable by said lever and connected to said shoes for applying the rebound shock through said shoes and against said walls and then subsequently moving said shoes along said walls as the rebound shock is being dissipated.

11. In a shock absorber, a casing, the interior side walls thereof having a plurality of frictional contact surfaces formed about different centers, shoes frictionally engaging the said contact surfaces within the casing, and means for applying unyielding substantially radial pressure to said shoes for causing relative movement between said casing and said shoes.

12. In a shock absorber, a casing, the interior side walls thereof having a plurality of frictional contact surfaces formed about different centers, shoes frictionally engaging the said contact surfaces within the casing, and means including a lever, and links movable by said lever and connected to said shoes for producing relative movement between said casing and said shoes.

13. In a shock absorber, a casing, the interior side walls thereof having a plurality of frictional contact surfaces formed about different centers, shoes frictionally engaging the said contact surfaces within the casing, said shoes and said casing being movable relative to each other and means including compression springs seated in the adjacent opposed ends of the shoes to maintain said shoes in frictional engagement with the interior side walls of the casing.

In testimony whereof I hereunto affix my signature this 28th day of Sept. 1925.

J. HARTZLER REDHEAD.